J. A. REAVIS.
DEVICE FOR FEEDING AND WATERING POULTRY.
APPLICATION FILED OCT. 3, 1912.

1,051,823.

Patented Jan. 28, 1913.

Witnesses:—
J. P. Walker
M. L. Sullivan

Inventor,
J. A. Reavis.
By
Attorneys

UNITED STATES PATENT OFFICE.

JAMES A. REAVIS, OF NAPA, CALIFORNIA.

DEVICE FOR FEEDING AND WATERING POULTRY.

1,051,823.   Specification of Letters Patent.   Patented Jan. 28, 1913.

Application filed October 3, 1912. Serial No. 723,779.

*To all whom it may concern:*

Be it known that I, JAMES A. REAVIS, a citizen of the United States, residing at Napa, in the county of Napa, State of California, have invented certain new and useful Improvements in Devices for Feeding and Watering Poultry; and I do hereby declare the following to be a full, clear, and exact description of the invention, such as will enable others skilled in the art to which it appertains to make and use the same.

This invention relates to devices for feeding and watering poultry.

The object of the invention resides in the provision of a device of the character named through the instrumentality of which feed and water may be supplied to poultry in a manner to prevent them from wasting or soiling the feed or contaminating the drinking water.

A further object of the invention resides in the provision of a device of this character which will be simple in construction, efficient in use and which may be manufactured at a comparatively small cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1:
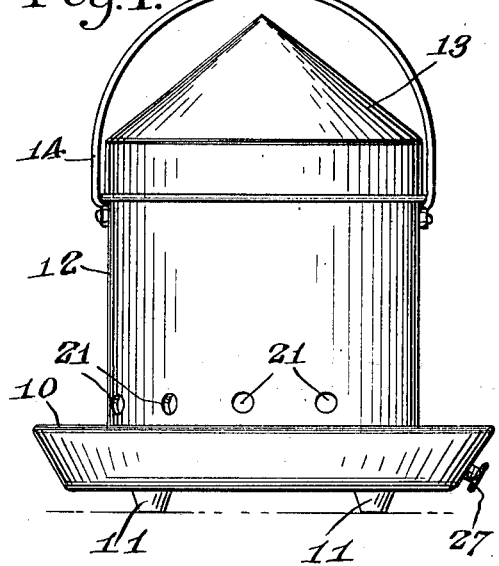
Figure 3:
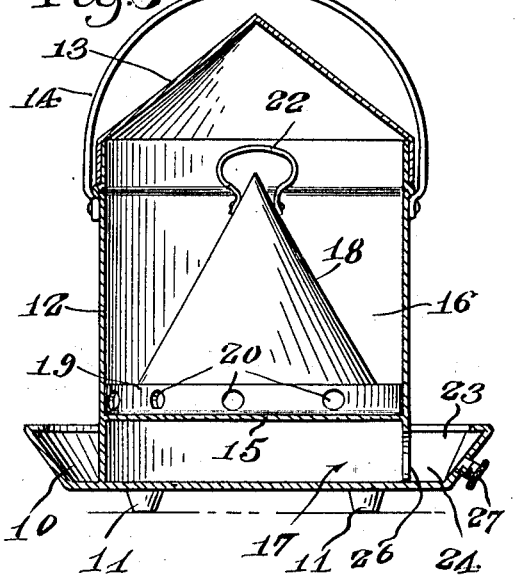
Figure 2:
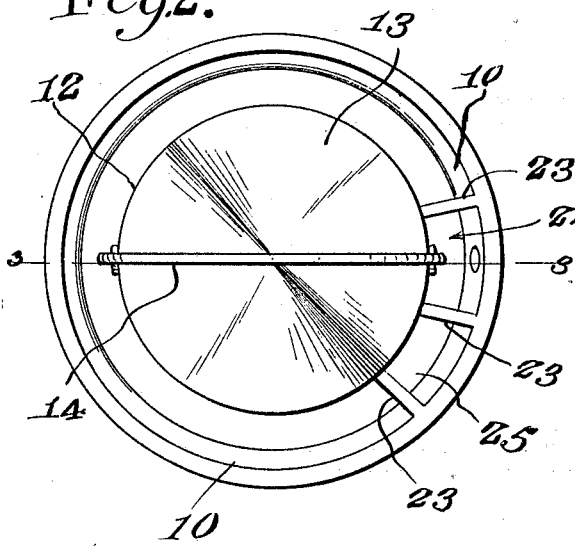
Figure 4:
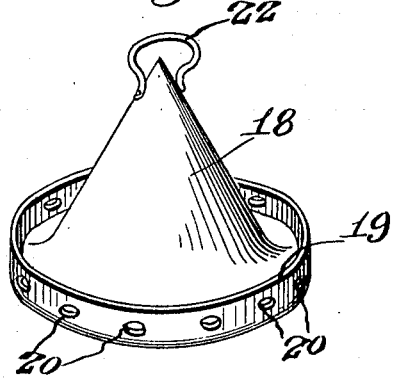

Figure 1 is a side elevation of the invention. Fig. 2 a plan view thereof. Fig. 3 a section on the line 3—3 of Fig. 2, and Fig. 4 a detail perspective view of the valve which controls the supply of feed from the feed reservoir to the pan of the device.

Referring to the drawings, the invention is shown as comprising a pan member 10 which is supported upon suitable knobs or legs 11. Rising from the bottom of the pan member 10 and disposed concentrically with the latter is a tubular member 12. The upper end of the tubular member 12 is provided with a removable top 13, while a bale 14 is pivoted to said tubular member and affords a means for transporting the device from one location to another. Disposed within the tubular member 12 just above the upper edge of the cam member 10 is a transverse partition 15 which divides the tubular member 12 into a feed compartment 16 disposed above the partition and a water compartment 17 disposed below the partition. Seated upon the partition 15 in the compartment 16 is a conical valve 18, the edge of which at the major end thereof is turned outwardly as at 19 and provided with a plurality of perforations 20 adapted to pass into and out of registration with perforations 21 formed in the side wall of the tubular member 12 as the valve 18 is rotated in the compartment 16. The minor end of the valve 18 is provided with a handle 22 whereby said valve may be readily rotated to bring the perforations 20 and 21 into and out of registration as may be desired.

Disposed between the side of the pan member 10 and the tubular member 12 are a plurality of radial partitions 23 which form a water space 24 and a grit space 25, the former being in communication with the water compartment 17 through the medium of an opening 26 formed in the side wall of the tubular member 12.

From this construction it will be apparent that through the medium of the valve 18 the delivery of feed from the compartment 16 to the pan member 10 may be readily controlled and that the feed will at all times be protected against being wasted and soiled by the fowls. The pan member 10 has mounted in its side wall a removable screw cap 27 whereby the pan may be drained and cleansed when desired.

What I claim is:—

In a device of the class described the combination of a feed pan, a tubular member arising from the bottom of said feed pan and disposed concentric with the latter, said tubular member having a plurality of openings in its wall above the feed pan and disposed in a common horizontal plane, a transverse partition in said tubular member between said openings and the upper edge of the feed pan, said partition dividing the interior of the tubular member into an upper feed compartment and a lower water compartment, a conical member rotatably mounted in said feed compartment and having its major end resting upon said partition and provided with outwardly and upwardly turned edges engaging the wall of the tubular member and having perforations therein adapted to move into and out of registration with the perforations in the wall of the tubular member during the rotation of said conical member, a removable closure for the upper end of said tubular member, radial partitions connecting the tubular member and the side of the feed pan and forming a water space, and means for supplying water from the lower water compartment to said water space.

In testimony whereof, I affix my signature in presence of two witnesses.

JAMES A. REAVIS.

Witnesses:
 EVERETT WILLIAMS,
 ENSIGN H. KING.